(12) United States Patent
Hirose (10) Patent No.: US 9,067,746 B2
(45) Date of Patent: Jun. 30, 2015

(54) IMAGE READING APPARATUS AND CONVEYANCE APPARATUS

(71) Applicant: Atsuo Hirose, Nagoya (JP)

(72) Inventor: Atsuo Hirose, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/228,552

(22) Filed: Mar. 28, 2014

(65) Prior Publication Data

US 2014/0291928 A1    Oct. 2, 2014

(30) Foreign Application Priority Data

Mar. 29, 2013  (JP) ................................. 2013-071206

(51) Int. Cl.
*B65H 5/06*  (2006.01)
*B65H 29/12*  (2006.01)

(52) U.S. Cl.
CPC .............. *B65H 5/062* (2013.01); *B65H 29/125* (2013.01)

(58) Field of Classification Search
CPC . B65H 5/062; B65H 29/125; B65H 2405/114
USPC .................................................. 271/272–274
See application file for complete search history.

(56) References Cited

U.S. PATENT DOCUMENTS

| 7,954,803 | B2 | 6/2011 | Kitagawa et al. |
| 8,177,229 | B2 * | 5/2012 | Ledgerwood et al. ........ 271/271 |
| 2008/0285097 | A1 | 11/2008 | Kitagawa et al. |

FOREIGN PATENT DOCUMENTS

| JP | H11-301900 A | 11/1999 |
| JP | 2004-035242 A | 2/2004 |
| JP | 2006081096 A * | 3/2006 |
| JP | 2008-285259 A | 11/2008 |
| JP | 2009-151703 A | 7/2009 |
| JP | 2012100115 A * | 5/2012 |

* cited by examiner

*Primary Examiner* — Luis A Gonzalez
(74) *Attorney, Agent, or Firm* — Banner & Witcoff, Ltd.

(57) ABSTRACT

An image reading apparatus including an wall disposed on a first side of the image reading apparatus in a width direction orthogonal to a conveyance direction of a sheet is provided. The wall extends in a direction orthogonal to the width direction. The image reading apparatus further includes a first driven roller disposed on a second side in the width direction relative to the wall; a first driving roller opposed to the first driven roller; a first driven shaft inserted into the first driven roller and urged against the first driving roller; a second driven roller disposed on the second side relative to the first driven roller; a second driving roller opposed to the second driven roller; a second driven shaft inserted into the second driven roller and urged against the second driving roller; and a reader unit configured to read the image on the sheet.

22 Claims, 10 Drawing Sheets

IMAGE READING APPARATUS AND CONVEYANCE APPARATUS

CROSS-REFERENCE TO RELATED APPLICATION

This application claims priority under 35 U.S.C. §119 from Japanese Patent Applications No. 2013-071206 filed on Mar. 29, 2013. The entire subject matter of the application is incorporated herein by reference.

BACKGROUND

1. Technical Field

An aspect of the present invention relates to an image reading apparatus and a conveyance apparatus.

2. Related Art

Conventionally, there has been suggested an image reading apparatus which reads an image of a sheet while conveying the sheet in a predetermined direction. In one example of the conventional image reading apparatus, three driving rollers and three driven rollers are provided for conveying the sheet. The three driven rollers are opposed to the three driving rollers, respectively. The three driven rollers are separately attached to two driven shafts. Specifically, two of the driven rollers are attached to one driven shaft, and the other driven roller is attached to the other driven shaft. Each end portion of each driven roller is pressed by a coil spring against the driving roller. Thus, each driven roller is urged against each driving roller. According to this configuration, the sheet can be conveyed with conveyance force applied to the sheet between the driving roller and the driven roller.

SUMMARY

In the conventional image reading apparatus as described above, if the same coil springs are employed to press the driven shafts, nipping force applied by each of two roller pairs attached to the one driven shaft becomes different from nipping force applied by the one roller pair attached to the other driven shaft. As a result, skewing of the sheet might be occurred due to difference of the conveying force applied to the sheet by each roller pair.

Aspects of the present invention provide an improved image reading apparatus and conveyance apparatus, in which skewing of the sheet can be suppressed.

According to aspects of the present invention, an image reading apparatus is provided. The image reading apparatus includes an wall disposed on a first side of the image reading apparatus in a width direction, the wall extending in a direction orthogonal to the width direction and the width direction being orthogonal to a conveyance direction of a sheet on which an image to be read by the image reading apparatus is formed; a first driven roller disposed on a second side of the image reading apparatus in the width direction relative to the wall, the second side being opposite to the first side; a first driving roller opposed to the first driven roller; a first driven shaft inserted into the first driven roller and urged against the first driving roller; a second driven roller disposed on the second side relative to the first driven roller; a second driving roller opposed to the second driven roller; a second driven shaft inserted into the second driven roller and urged against the second driving roller; and a reader unit configured to read the image on the sheet.

According to aspects of the present invention, a conveyance apparatus is provided. The conveyance apparatus includes an wall disposed on a first side of the conveyance apparatus in a width direction, the wall extending in a direction orthogonal to the width direction and the width direction being orthogonal to a conveyance direction of a sheet to be conveyed; a first driven roller disposed on a second side of the conveyance apparatus in the width direction relative to the wall, the second side being opposite to the first side; a first driving roller opposed to the first driven roller; a first driven shaft inserted into the first driven roller and urged against the first driving roller; a second driven roller disposed on the second side relative to the first driven roller; a second driving roller opposed to the second driven roller; and a second driven shaft inserted into the second driven roller and urged against the second driving roller.

DETAILED DESCRIPTION

Hereinafter, an embodiment according to aspects of the invention will be described with reference to the accompany drawings.

Figure 1:
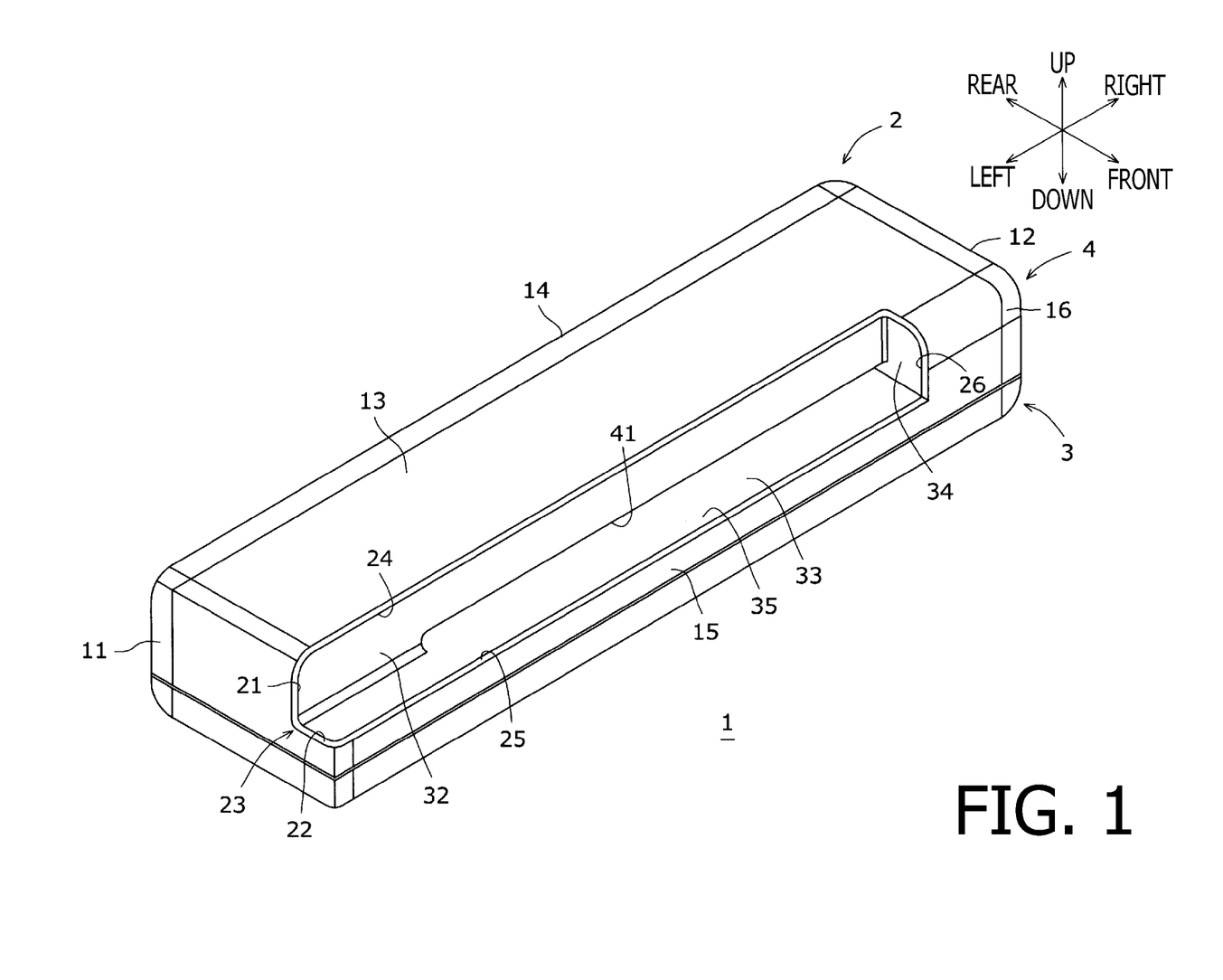
FIG. 1 is a perspective view showing an image reading apparatus according to an embodiment of the present invention.
Figure 2:
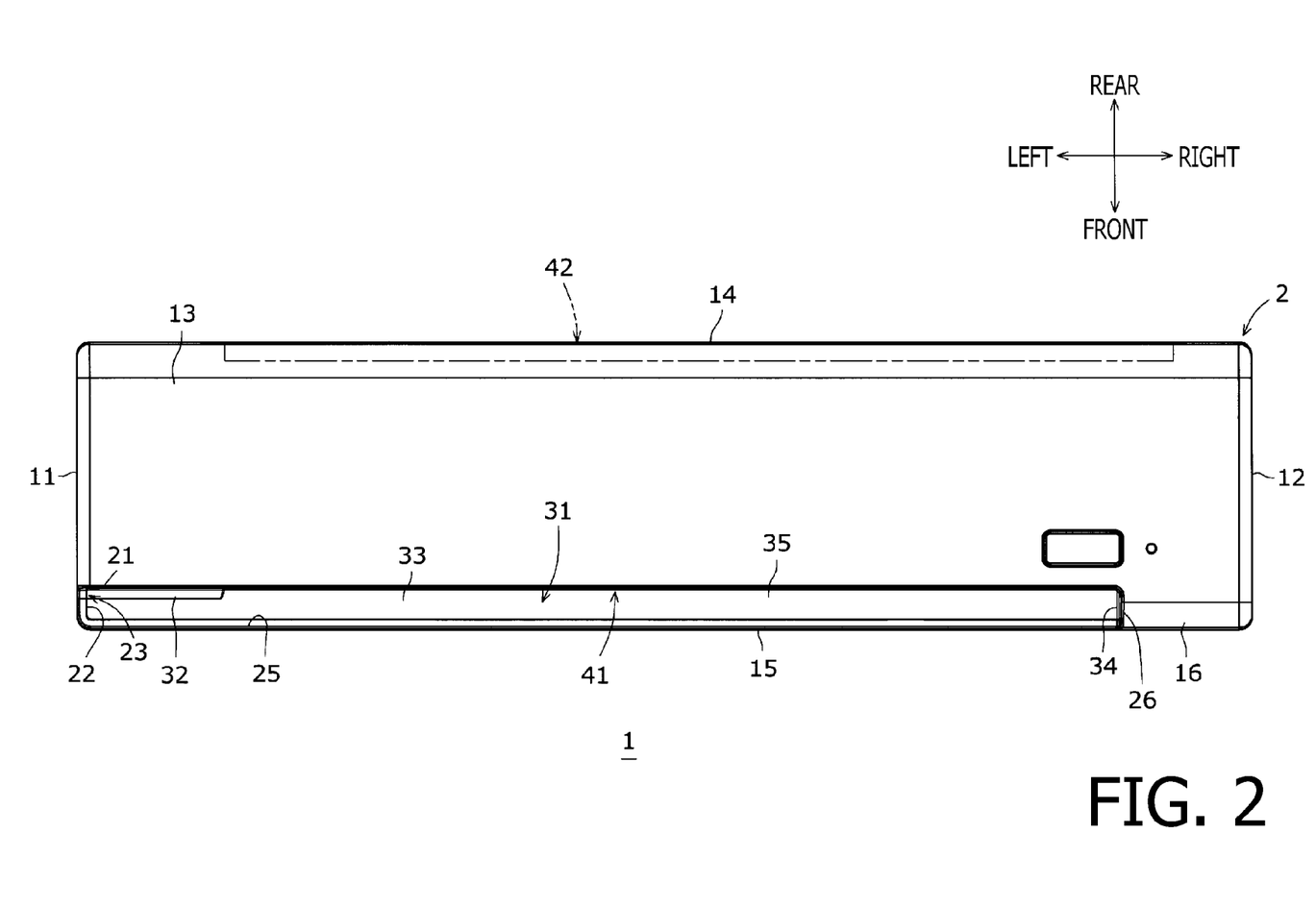
FIG. 2 is a plane view of the image reading apparatus.
Figure 3:
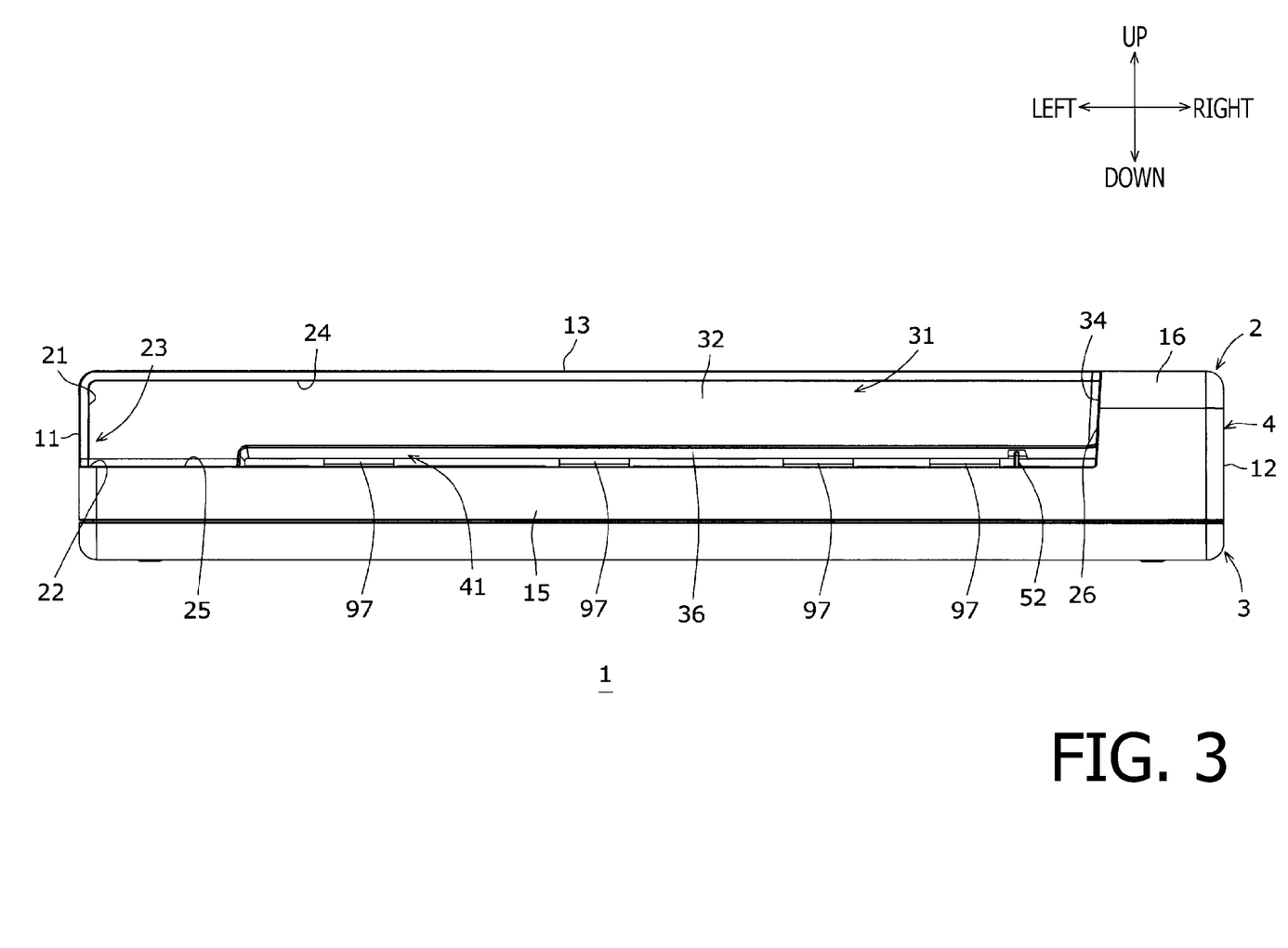
FIG. 3 is a front view of the image reading apparatus.
Figure 4:
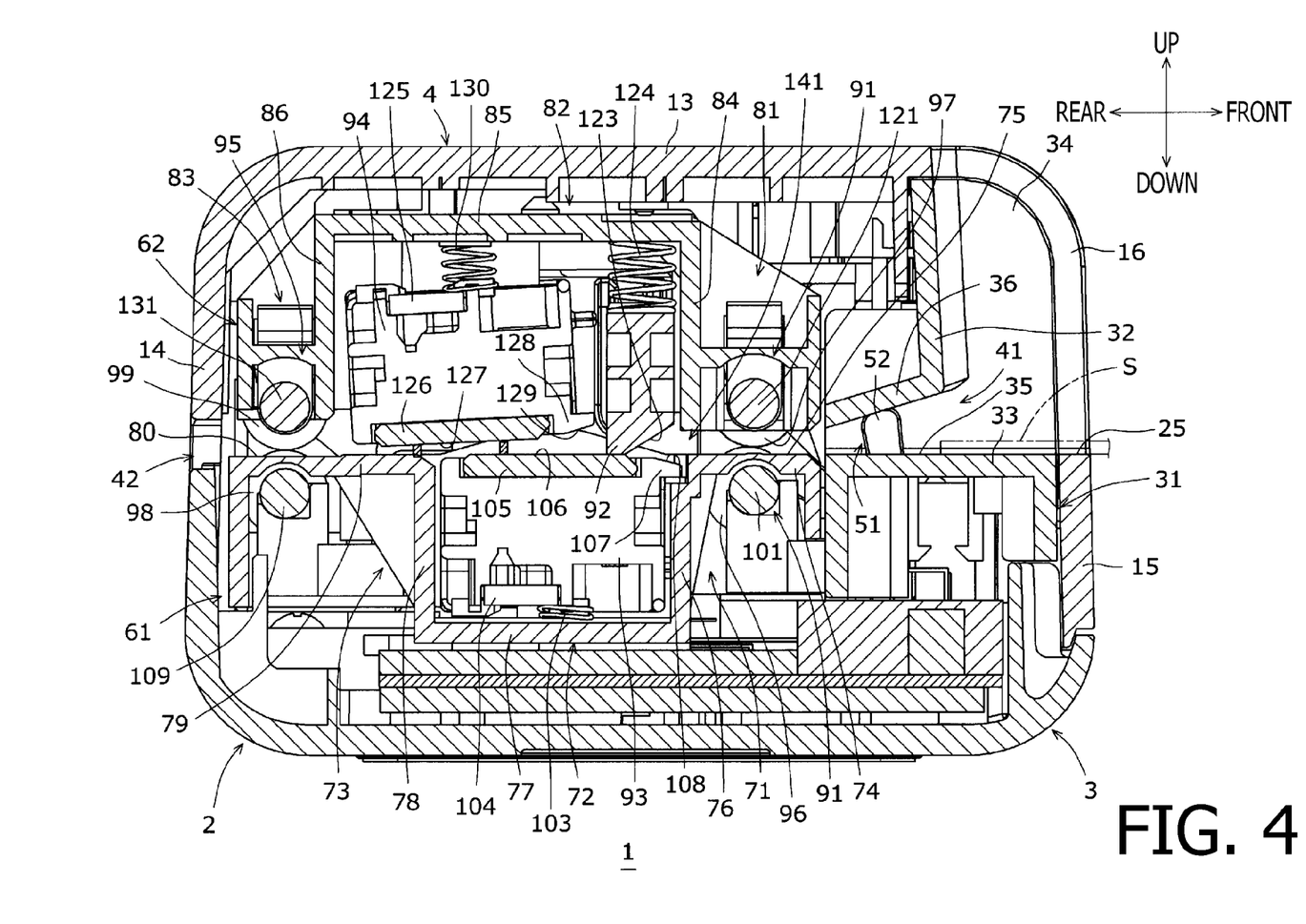
FIG. 4 is a cross-sectional side view of the image reading apparatus.

An image reading apparatus 1 according to an embodiment of the present invention includes a housing 2 as shown in FIGS. 1, 2, 3 and 4. As shown in FIGS. 1, 3 and 4, the housing 2 can be separated into a bottom cover 3 and a top cover 4.

In the embodiment described below, directions concerning the image reading apparatus 1 will be referred to based on orientations indicated by arrows shown in each drawing. For example, in FIG. 1, a side on which the top cover 4 is disposed with respect to the bottom cover 3 is referred to as an upper side of the image reading apparatus 1. A viewer's lower-right side, on which an inlet 41 described later is disposed, is referred to as a front side of the image reading apparatus 1. A right-to-left or left-to-right direction of the image reading apparatus 1 is referred to as a right-left direction or a width direction. An up-to-down or down-to up direction is referred to as an up-down direction. A front-to-rear or rear-to-front direction may be referred to as a front-rear direction.

As shown in FIGS. 1, 3 and 4, the top cover 4 is disposed over the bottom cover 3 from above. As shown in FIG. 2, the top cover 4 includes a left surface 11, a right surface 12, an upper surface 13, a rear surface 14, a front surface 15 and a curved surface 16.

The left surface 11 extends in the up-down direction and the front-rear direction. As shown in FIGS. 1, 2 and 3, an upper-front end portion of the left surface 11 is cut out. Thus, a first edge 21 and a second edge 22 are formed on the upper-front end portion of the left surface 11. The first edge 21 extends in the up-down direction and the second edge 22 extends forward from the lower end of the first edge 21. In other words, the left surface 11 includes a cutout 23 formed by the first edge 21 and the second edge 22.

The right surface 12 is disposed parallel to the left surface 11 with an interval therebetween in the right-left direction. The right surface 12 extends in the up-down direction and the front-rear direction.

The upper surface 13 is disposed to bridge between upper ends of the left surface 11 and the right surface 12. The upper surface 13 extends in the right-left direction and the front-rear direction. On a front end of the upper surface 13, a third edge 24 is formed. The third edge 24 extends to the right from an upper end of the first edge 21 of the left surface 11. The length of the third edge 24 is shorter than the interval between the left surface 11 and the right surface 12 in the right-left direction.

As shown in FIG. 2, the rear surface 14 is disposed to bridge between rear ends of the left surface 11 and the right surface 12. The rear surface 14 extends in the up-down direction and the right-left direction. As shown in FIG. 4, an upper end of the rear surface 14 is connected to a rear end of the upper surface 13.

As shown in FIGS. 1 and 3, the front surface 15 is disposed to bridge between front ends of the left surface 11 and the right surface 12. On an upper end of the front surface 15, a fourth edge 25 is formed. The fourth edge 25 extends to the right from a front end of the second edge 22 of the left surface 11. The length of the fourth edge 25 is the same as the length of the third edge 24 of the upper surface 13.

As shown in FIGS. 1, 2 and 3, the curved surface 16 is disposed to bridge between an front-right end of the upper surface 13 and an upper-right end of the front surface 15. A right end of the curved surface 16 is connected to an upper-front end of the right surface 12. On a left end of the curved surface 16, a fifth edge 26 is formed. The fifth edge 26 extends forward from a right end of the third edge 24, curves downward, and is connected to a right end of the fourth edge 25.

The top cover 4 further includes a front frame 31.

The front frame 31 includes a first wall 32, a second wall 33, a third wall 34 and a fourth wall 36.

As shown in FIGS. 1 and 3, the first wall 32 extends in the up-down direction and the right-left direction. A left end of the first wall 32 is connected to the first edge 21 of the left surface 11. An upper end of the first wall 32 is connected to the third edge 24 of the upper surface 13.

As shown in FIGS. 1 and 2, the second wall 33 extends in the right-left direction and the front-rear direction. A left end of the second wall 33 is connected to the second edge 22 of the left surface 11. A front end of the second wall 33 is connected to the fourth edge 25 of the front surface 15.

As shown in FIGS. 1 and 4, the third wall 34 extends in the up-down direction and the front-rear direction. An upper end and a front end of the third wall 34 are connected to the fifth edge 26. A rear end of the third wall 34 is connected to the first wall 32. A lower end of the third wall 34 is connected to the second wall 33.

As shown in FIGS. 1 and 3, a part of lower end portion of the first wall 32 is cut out such that a lower-left end portion of the first wall 32 remains. A cutout portion surrounded by the first wall 32, the second wall 33 and the third wall 34 forms the inlet 41.

As shown in FIG. 4, the fourth wall 36 extends downward and rearward from the cutout portion of the lower end of the first wall 32. A lower-rear end of the fourth wall 36 is located above the rear end of the second wall 33 with an interval therebetween. A lower-rear end portion of the third wall 34 extends between the right ends of the fourth wall 36 and the second wall 33. An upper edge and a lower edge of the lower-rear end portion of the third wall 34 are respectively connected to the fourth wall 36 and the second wall 33.

As shown in FIG. 4, an outlet 42 is formed on the housing 2 between the bottom cover 3 and the rear surface 14 of the top cover 4. The outlet 42 is located on substantially the same position as the inlet 41 in the up-down direction and the right-left direction.

<Internal Mechanism>

The image reading apparatus further includes a first holder 61 and a second holder 62.

The first holder 61 includes a first lower holding portion 71, a second lower holding portion 72 and a third lower holding portion 73. The first lower holding portion 71, the second lower holding portion 72 and the third lower holding portion 73 are arranged in this order from the front in the front-rear direction.

The first lower holding portion 71 includes a front chute 74. The front chute 74 extends in the right-left direction and the front-rear direction. An upper surface 75 of the front chute 74 is located on the same plane as the upper surface 35 of the second wall 33.

The second lower holding portion 72 includes a front wall 76, a bottom wall 77 and a rear wall 78. The front wall 76 extends downward from a rear end of the front chute 74. The bottom wall 77 extends rearward from a lower end of the front wall 76. The rear wall 78 extends upward from a rear end of the bottom wall 77.

The third lower holding portion 73 includes a rear chute 79. The rear chute 79 extends rearward from an upper end of the rear wall 78 of the second lower holding portion 72. A rear end portion of an upper surface 80 of the rear chute 79 is located above a lower end of the outlet 42.

The second holder 62 is disposed on an upper side of a plane including an upper surface 35 of the second wall 33. The second holder 62 includes a first upper holding portion 81, a second upper holding portion 82 and a third upper holding portion 83. The first upper holding portion 81, the second upper holding portion 82 and the third upper holding portion 83 are arranged in this order from the front in the front-rear direction.

The second upper holding portion 82 includes a front wall 84, an upper wall 85 and a rear wall 86. The front wall 84 is located on the same position as the front wall 76 of the first holder 61 in the front-rear direction. The front wall 84 extends in the up-down direction and the right-left direction. The upper wall 85 extends rearward from an upper end of the front wall 84. The rear wall 86 extends downward from a rear end of the upper wall 85. The rear wall 86 is parallel to the front wall 84. The rear wall 86 is located on the rear side of the rear wall 78 of the first holder 61 in the front-rear direction.

The image reading apparatus 1 further includes conveyance roller pairs 91, a sheet pressing member 92, a first reader unit 93, a second reader unit 94 and discharge roller pairs 95.

The conveyance roller pairs 91 include four conveyance driving rollers 96 and four conveyance driven rollers 97.

The four conveyance driving rollers 96 are attached to a driving shaft 101. The driving shaft 101 extends in the right-left direction. The driving shaft 101 is rotatably supported on the first lower holding portion 71 of the first holder 61. A part of a circumferential surface of each conveyance driving roller 96 is projected upward from the upper surface 75 of the front chute 74.

The four conveyance driven rollers 97 are attached to a driven shaft 121. The driven shaft 121 extends in the right-left direction. The driven shaft 121 is rotatably supported on the first upper holding portion 81 of the second holder 62. Each conveyance driven roller 97 is disposed above the conveyance driving roller 96 such that a part of a circumferential surface of each conveyance driven roller 97 contacts with a circumferential surface of the conveyance driving roller 96 located on the downside thereof.

The sheet pressing member 92 is disposed on the rear side of the front wall 84 of the second holder 62. The sheet pressing member 92 extends in the up-down direction and the right-left direction. A lower end of the sheet holding part 92 is located above a front end of a transparent plate 105 of the first reader unit 93. The sheet pressing member 92 has an inclined surface 123 inclined in a lower-rear direction on a lower end thereof. The sheet pressing member 92 is urged downward by a compressed coil spring 124. One end of the compressed coil spring 124 is fixed to the upper wall 85 of the second holder 62. The other end of the compressed coil spring 124 is fixed to an upper end of the sheet pressing member 92.

The first reader unit 93 is disposed in the second lower holding portion 72 of the first holder 61. Specifically, the first reader unit 93 is located on the bottom wall 77 between the front wall 76 and the rear wall 78 of the first holder 61. The first reader unit 93 is urged against the second reader unit 94 by a first urging member 103. The first urging member 103 may be a compressed coil spring. The first urging member 13 is located between the bottom cover 3 and the first reader unit 93. The first reader unit 93 is a contact image sensor unit including an LED light source, one or more lenses and an image sensor 104. The first image reader unit 93 includes the transparent plate 105 on an upper surface thereof. A first reading surface 106 formed on an upper surface of the transparent plate 105 is located on the same plane as or below the upper surface 75 of the front chute 74. The first reader unit 93 includes an extending portion 107 on the front side of the transparent plate 105. The extending portion 107 has an inclined surface 108 inclined in a lower-front direction as an upper surface thereof.

The second reader unit 94 is disposed on the rear side of the sheet pressing member 92. The second image reader unit 94 is a contact image sensor having the same configuration as the first image reader unit 93. Specifically, the second image reader unit 94 includes an LED light source, one or more lenses and an image sensor 125. The second image reader unit 94 is disposed such that the up-down direction thereof is reversed with respect to the first reader unit 93. Thus, the second image reader unit 94 includes a transparent plate 126 on a bottom surface.

The second reader unit 94 is inclined such that a second reading surface 127 formed on the bottom surface of the transparent plate 126 is inclined in the upper-front direction. The second reader unit 94 includes an extending portion 128 on the front side of the transparent plate 126. The extending portion 128 has an inclined surface 129 inclined in the upper-front direction on the bottom surface thereof. The second reader unit 94 is urged against the first reader unit 93 by a second urging member 130. The second urging member 130 may be a compressed coil spring. The second urging member 130 is located between the upper wall 85 of the second holder 62 and the second reader unit 94.

The discharge roller pairs 95 include four discharge driving rollers 98 and four discharge driven rollers 99.

The four discharge driving rollers 98 are attached to a driving shaft 109. The driving shaft 109 extends in the right-left direction. The driving shaft 109 is rotatably supported on the third lower holding portion 73 of the first holder 61. A part of a circumferential surface of each discharge driving roller 98 is projected upward from the upper surface 80 of the rear chute 79.

The four discharge driven rollers 99 are attached to a driven shaft 131. The driven shaft 131 extends in the right-left direction. The driven shaft 131 is rotatably supported on the third upper holding portion 83 of the second holder 62. Each discharge driven roller 99 is disposed above the discharge driving roller 99 such that a part of a circumferential surface of each discharge driven roller 99 contacts with a circumferential surface of the discharge driving roller 98 located on the downside thereof.

The image reading apparatus 1 further includes a sensor 51.

The sensor 51 may be a microswitch. A main body of the sensor 51 is disposed below the second wall 33. An actuator 52 of the sensor 51 penetrates through the second wall 33 in the up-down direction such that a leading end thereof is located above the second wall 33. As shown in FIG. 3, the actuator 52 is located between the rightmost conveyance driven roller 97 and the third wall 34 in the right-left direction.

<Reading Image on a Sheet>

In the housing 2, a conveyer path 141 through which a sheet S is conveyed is formed between the first holder 61 and the second holder 62.

Since the second wall 33, on which the sheet S to be introduced through the inlet 41 is placed, extends to the left surface 11, the third wall 34 of the front frame 31 is exposed on the left side thereof. According to this configuration, a user can easily recognize that the third wall 34 is a reference position to place the sheet S in the right-left direction.

For reading an image from the sheet S, firstly, the single sheet S placed on the upper surface 35 of the second wall 33 is inserted into the inlet 41. At this time, the sheet S is placed such that the right end thereof is abutted on the third wall 34.

When the sheet S is inserted into the inlet 41, the sensor 51 detects the sheet S. In response to the detection of the sheet S by the sensor 51, the conveyance driving rollers 96 and the discharge driving rollers 98 start to rotate in a counter clockwise direction viewed from the left side of the image reading apparatus 1. In accordance with the rotation of the conveyance driving rollers 96 and the discharge driving rollers 98, the conveyance driven rollers 97 and the discharge driven rollers 99 rotate in a counter clockwise direction viewed from the left side of the image reading apparatus 1.

When a leading end of the sheet S reaches between the circumferential surfaces of the conveyance driving rollers 96 and the conveyance driven rollers 97 as the sheet S is further inserted, conveyance force is applied to the sheet S by the conveyance driving rollers 96 and the conveyance driven rollers 97. By the conveyance force, the sheet S is conveyed rearward while passing between the conveyance driving rollers 96 and the conveyance driven rollers 97.

Subsequently, the leading end of the sheet S contacts the inclined surface 123 of the sheet pressing member 92. As the sheet S is conveyed, the leading end of the sheet S slides on the inclined surface 123 toward the transparent plate 105 of the first reader unit 93. Then, the leading end of the sheet S moves away from the inclined surface 123 and moves into between the sheet pressing member 92 and the first reading surface 106 formed on the upper surface of the first transparent plate 105. The sheet S is pressed against the first reading surface 106 by the sheet pressing member 92 between the sheet pressing member 92 and the first transparent plate 105.

Accordingly, the sheet S passes over the first reading surface 106 while being pressed against the first reading surface 106. At this time, the light from the LED light source of the first reader unit 93 is emitted to the sheet S on the first reading surface 106. Then, reflected light from the sheet S is received by the image sensor 104 and thereby the image formed on the bottom side of the sheet S is read.

When the sheet S is further conveyed, the leading end of the sheet S contacts the second reading surface 127 formed on the bottom surface of the transparent plate 126 of the second reader unit 94. As the sheet S is conveyed, the leading end of the sheet S slides on the second reading surface 127. At this time, depending on a thickness of the sheet S, the sheet S pushes up the second reading surface 127 and the second reader unit 94 moves upward against the urging force applied by the second urging member 130.

Then, the sheet S passes below the second reading surface 127 while the upper side of the sheet S contacts the second reading surface 127. At this time, the light from the LED light source of the second reader unit 94 is emitted to the sheet S below the second reading surface 127. Then, reflected light from the sheet S is received by the image sensor 125 and thereby the image formed on the upper side of the sheet S is read.

When the leading end of the sheet S reaches between the circumferential surfaces of the discharge driving rollers 98 and the discharge driven rollers 99, the conveyance force is applied to the sheet S by the discharge driving rollers 98 and the discharge driven rollers 99. With the conveyance force, the sheet S is conveyed rearward and discharged through the outlet 42.

<Conveyance Roller Pairs>

Figure 6:
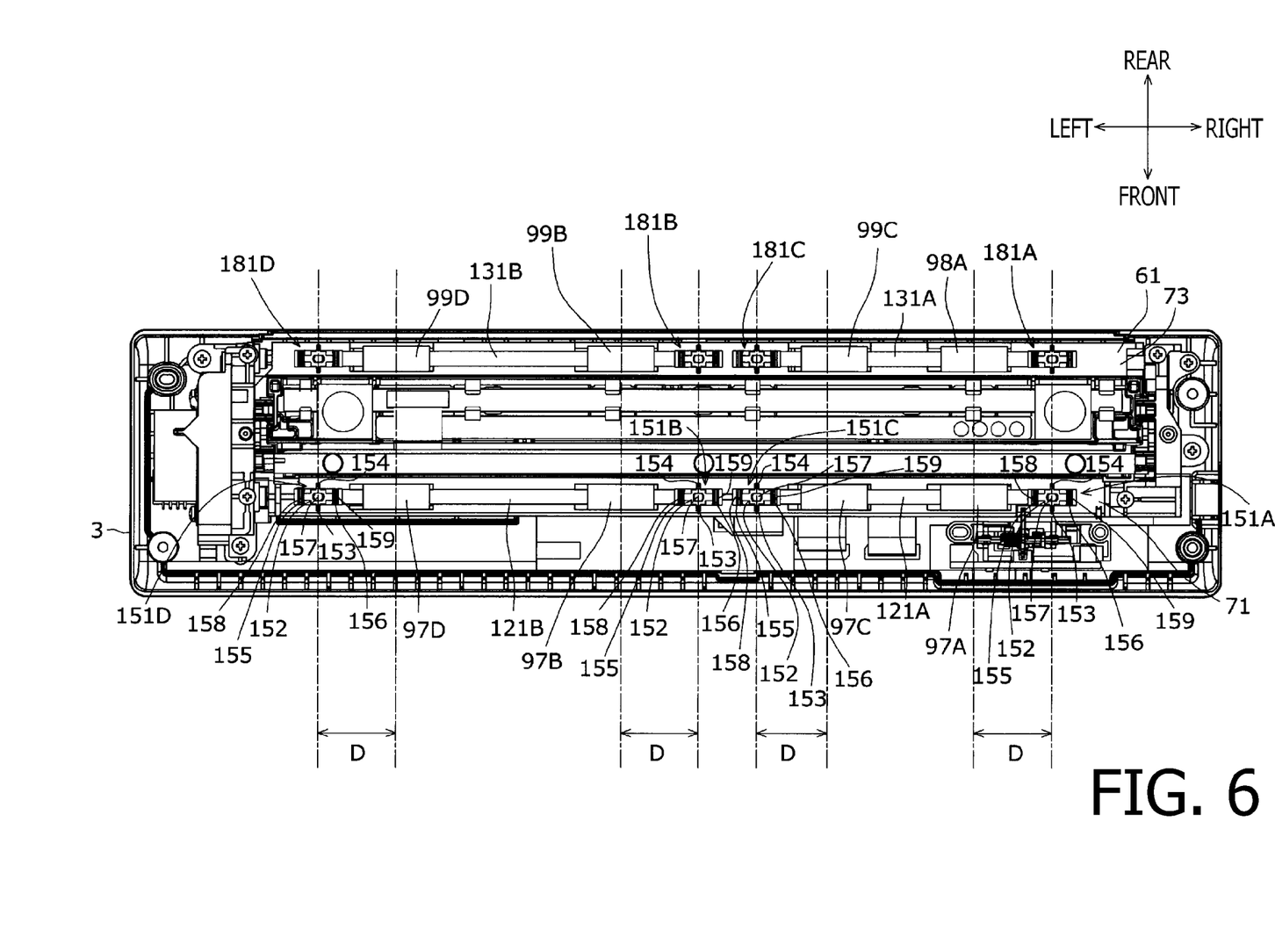
FIG. 6 is a plane view showing configurations of driven rollers, driven shafts and shaft bearings of the conveyance roller pairs and the discharge roller pairs.

As shown in FIG. 6, the four conveyance driven rollers 97 are arranged on a same straight line with intervals therebetween in the right-left direction. The four conveyance driven rollers 97 have the same configuration as each other.

Hereinafter, in order to distinguish each conveyance driven roller 97, a rightmost conveyance driven roller 97 is referred to as "a first driven roller 97A," a third rightmost conveyance driven roller 97 is referred to as "a second driven roller 97B," a conveyance driven roller 97 between the first driven roller 97A and the second driven roller 97B is referred to as "a third driven roller 97C," and a leftmost conveyance driven roller 97 is referred to as "a fourth driven roller 97D."

Figure 5:
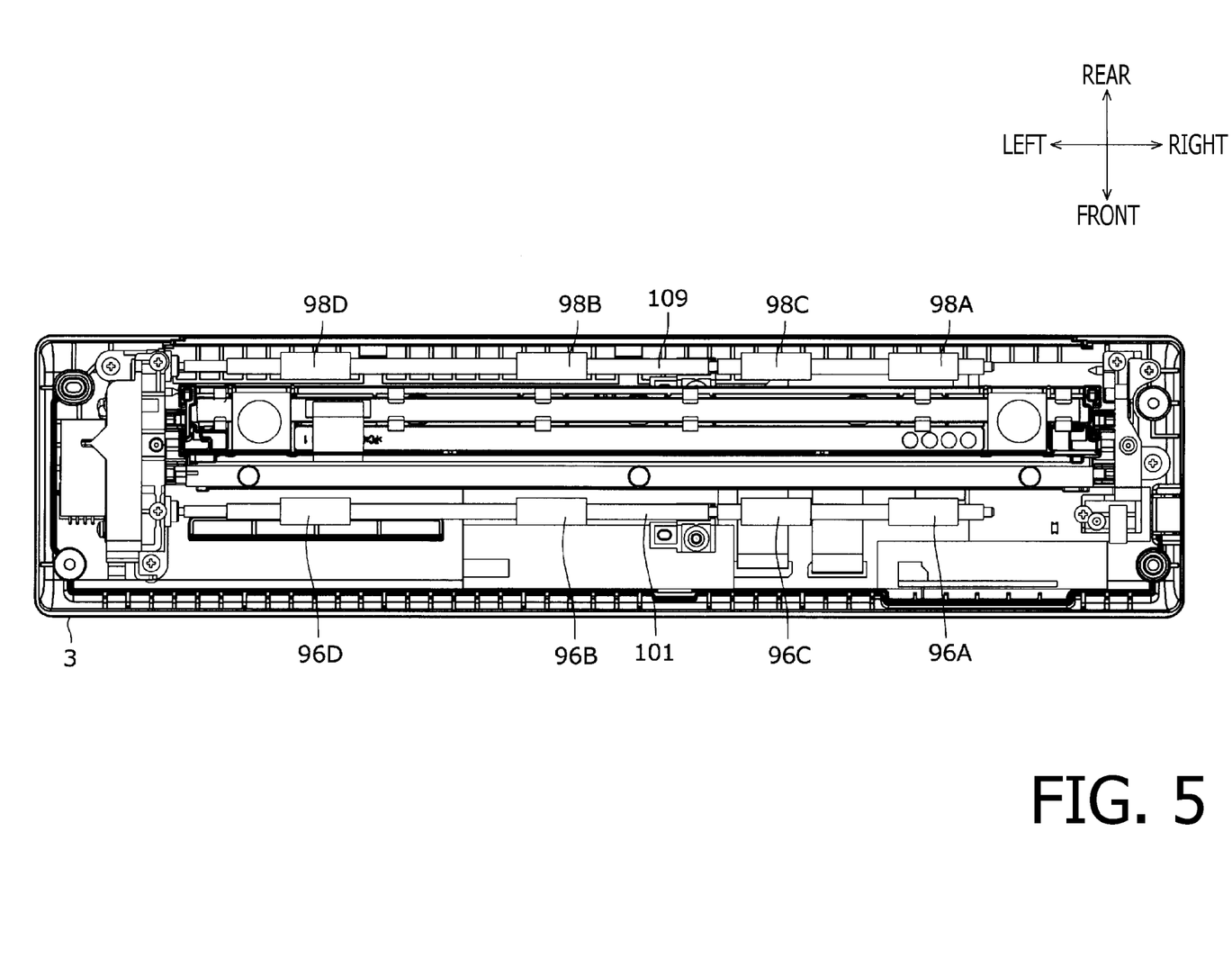
FIG. 5 is a plane view showing configurations of driving rollers and driving shafts of conveyance roller pairs and discharge roller pairs.

As shown in FIG. 5, the four conveyance driving rollers 96 are arranged on a same straight line with intervals therebetween in the right-left direction. The four conveyance driving rollers 96 have the same configuration as each other. The length of the conveyance driving rollers 96 is the same as the length of the conveyance driven rollers 97 in the right-left direction.

Hereinafter, in order to distinguish each conveyance driving roller 96, a rightmost conveyance driving roller 96 is referred to as "a first driving roller 96A," a third rightmost conveyance driving roller 96 is referred to as "a second driving roller 96B," a conveyance driving roller 96 between the first driving roller 96A and the second driving roller 96B is referred to as "a third driving roller 96C," and a leftmost conveyance driving roller 96 is referred to as "a fourth driving roller 96D."

Figure 7:
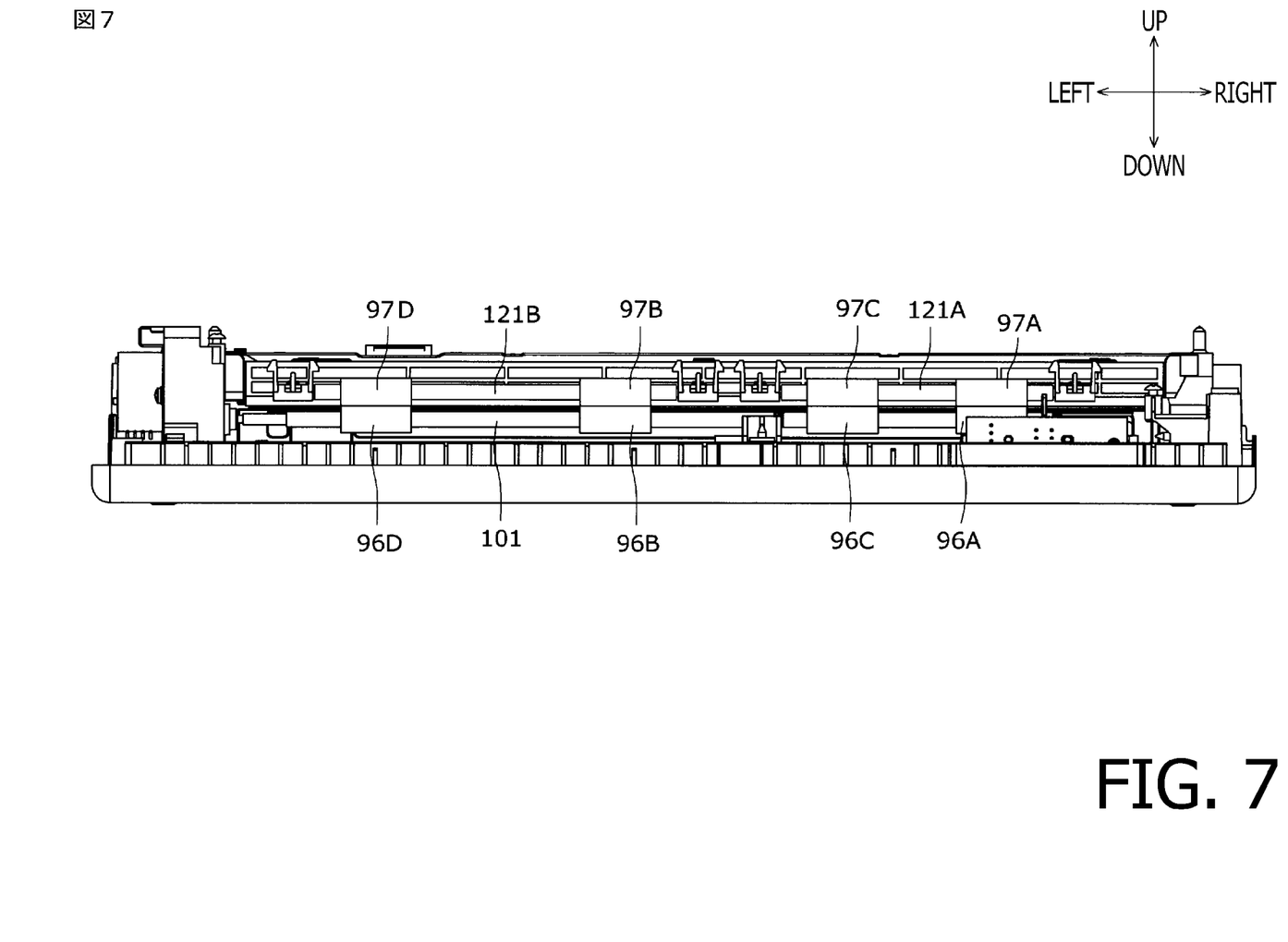
FIG. 7 is a front view of the image reading apparatus with a top cover and a second holder being removed.

The first driven roller 97A is disposed such that a distance between a left end of the first driven roller 97A and the third wall 34 of the front frame 31 in the right-left direction is shorter than 51 mm (millimeter). As shown in FIG. 7, the first driving roller 96A is disposed below the first driven roller 97A and on the same position as the first driven roller 97A in the right-left direction.

According to this configuration, the sheet S, of which width is between about 51 mm and 57.5 mm in the right-left direction, is conveyed by the first driven roller 97A and the first driving roller 96A while contacting the circumferential surfaces thereof. In this regard, the right and left ends of the sheet S do not contact the first driven roller 97A and the first driving roller 96A. For example, the sheet S of which width in the right-left direction is less than 57.5 mm may include a register receipt and a card sized sheet defined in International Standard ID-1 of International Organization for Standardization (ISO)/International Electrotechnical Commission (IEC) conveyed longitudinally.

The second driven roller 97B is disposed such that a distance between a right end of the second driven roller 97B and the third wall 34 in the right-left direction is longer than 100 mm and a distance between a left end of the second driven roller 97B and the third wall 34 in the right-left direction is shorter than 148 mm. The second driving roller 96B is disposed below the second driven roller 97B and on the same position as the second driven roller 97B in the right-left direction.

According to this configuration, the sheet S of which width is between about 148 mm and 176 mm in the right-left direction is conveyed by the first driven roller 97A, the second driven roller 97B and the third driven roller 97C and the first driving roller 96A, the second driving roller 96B and the third driving roller 96C while contacting the circumferential surfaces thereof. In this regard, the right and the left ends of the sheet S do not contact the second driven roller 97B and the second driving roller 96B. For example, the sheet S of which width is between about 148 mm and 176 mm in the right-left direction may include a post card sized sheet, an A5 sized sheet defined by Japanese Industrial Standards (JIS) and a B5 sized sheet defined by JIS, conveyed laterally.

The third driven roller 97C is disposed such that a distance between a right end of the third driven roller 97C and the third wall 34 in the right-left direction is longer than 57.5 mm and a distance between a left end of the third driven roller 97C and the third wall 34 in the right-left direction is shorter than 85 mm. The third driving roller 96C is disposed below the third driven roller 97C and on the same position as the third driven roller 97C in the right-left direction.

According to this configuration, the sheet S of which width is between about 85 mm and 100 mm is conveyed by the first driven roller 97A and the third driven roller 97C, and the first driving roller 96A and the third driving roller 96C while contacting the circumferential surfaces thereof. In this regard, the right and the left ends of the sheet S do not contact the third driven roller 97C and the third driving roller 96C. For example, the sheet S of which width is between about 85 mm and 100 mm in the right-left direction may include a post card sized sheet conveyed longitudinally and a card sized sheet defined in International Standard ID-1 conveyed laterally.

The fourth driven roller 97D is disposed such that a distance between a right end of the fourth driven roller 97D and the third wall 34 in the right-left direction is longer than 176 mm and a distance between a left end of the fourth driven roller 97D and the third wall 34 in the right-left direction is shorter than 210 mm. The fourth driving roller 96D is disposed below the fourth driven roller 97D and on the same position as the fourth driven roller 97D in the right-left direction.

According to this configuration, the sheet S of which width is between about 210 mm and 215.9 mm in the right-left direction is conveyed by the first driven roller 97A, the second driven roller 97B, the third driven roller 97C and the fourth driven roller 97D, and the first driving roller 96A, the second driving roller 96B, the third driving roller 96C and the fourth driving roller 96D while contacting the circumferential surfaces thereof. In this regard, the right and the left ends of the sheet S do not contact the fourth driven roller 97D and the fourth driving roller 96D. For example, the sheet S of which width is between about 210 mm and 215.9 mm in the right-left direction may include an A5 sized sheet defined by JIS conveyed longitudinally and an LTR (letter) sized sheet conveyed longitudinally.

The driven shaft 121 includes a first driven shaft 121A and a second driven shaft 121B separated from each other. The first driven shaft 121A is shorter than the second driven shaft 121B. The first driven shaft 121A is inserted into the first driven roller 97A and the third driven roller 97C so as to be a common rotation shat thereof. End portions of the first driven shaft 121A project from the right side of the first driven roller 97A and the left side of the third driven roller 97C. The projected length of the right and the left end portions of the first driven shaft 121A are the same. The second driven shaft 121B is inserted into the second driven roller 97B and the fourth driven roller 97D so as to be a common rotation shaft thereof. End portions of the second driven shaft 121B project from the right side of the second driven roller 97B and the left side of the fourth driven roller 97D. The projected length of the right and the left end portions of the second driven shaft 121B are the same.

As shown in FIGS. 6, 7, 8 and 9, the right end portion and the left end portion of the first driven shaft 121A are rotatably inserted into a shaft bearing 151A and a shaft bearing 151C, respectively. The right end portion and the left end portion of the second driven shaft 121B are rotatably inserted into a shaft bearing 151B and a shaft bearing 151D, respectively. Each shaft bearing 151A, 151B, 151C and 151D is elastically-supported by the first upper holding portion 81 of the second holder 62, and thereby the first driven shaft 121A and the second driven shaft 121B is rotatable supported by the first upper holding portion 81.

Figure 8:
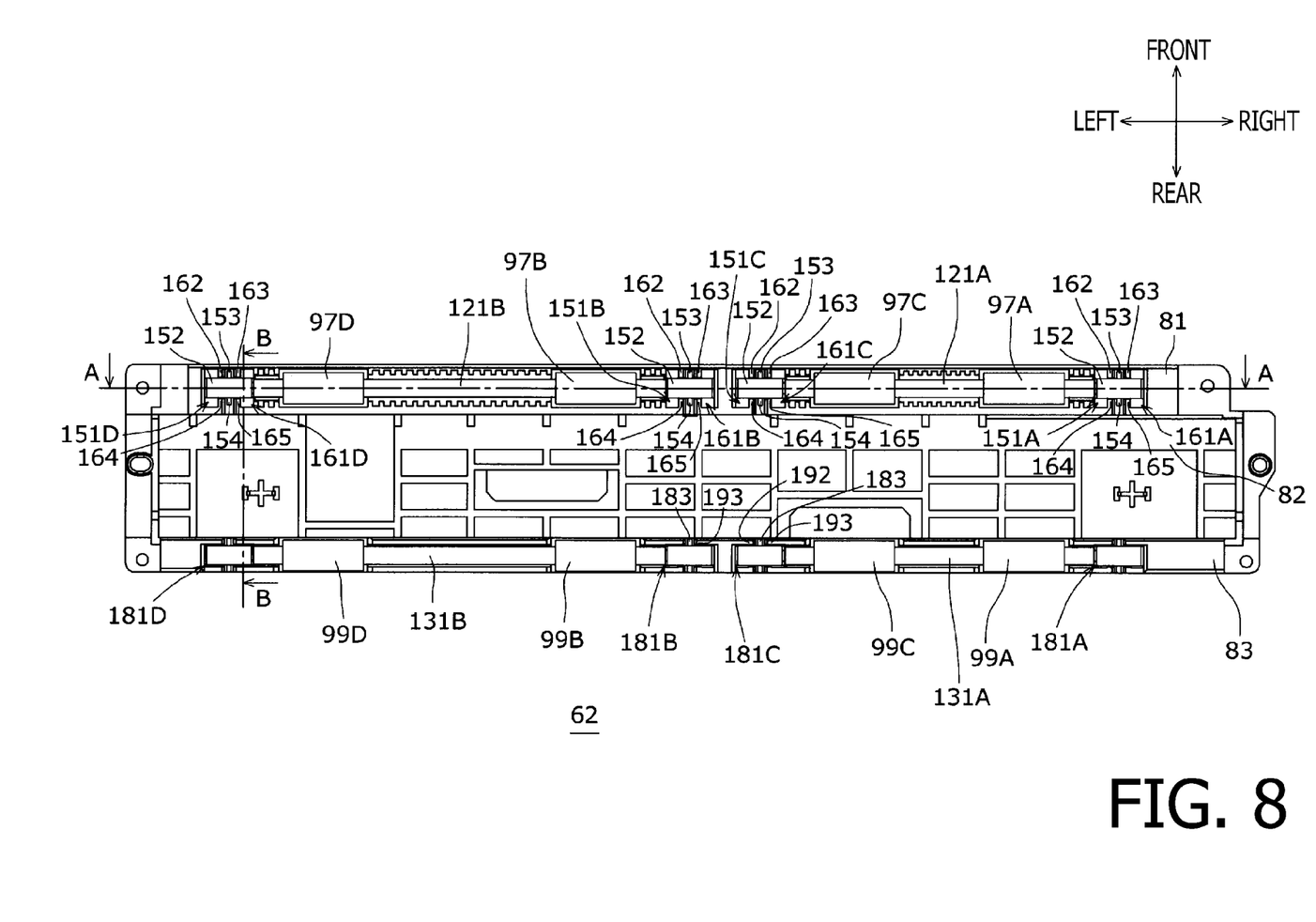
FIG. 8 is a bottom view of a first holder.
Figure 9:
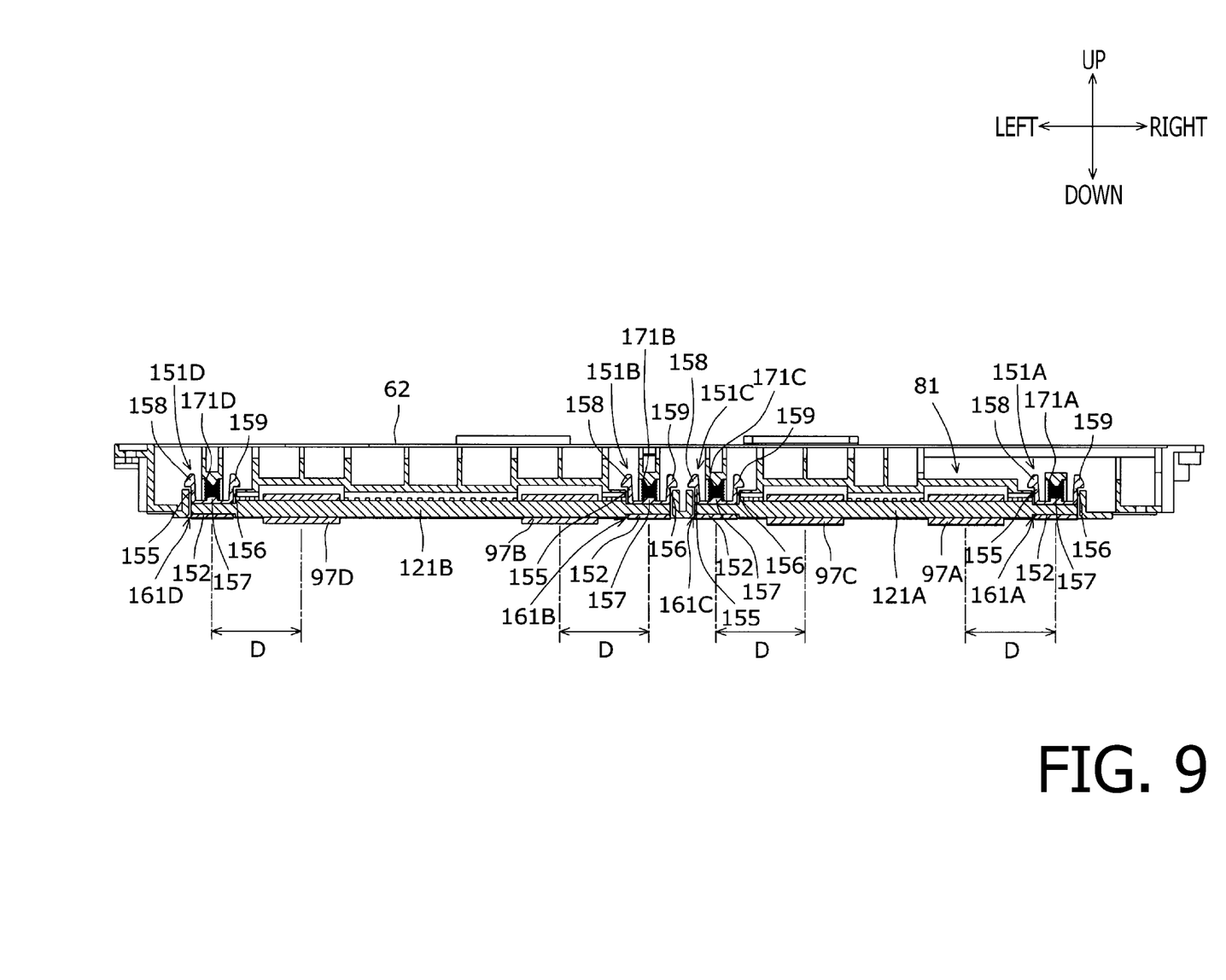
FIG. 9 is a cross-sectional side view of the first holder sectioned by an A-A line shown in FIG. 8.

Specifically, each shaft bearing 151A, 151B, 151C and 151D integrally includes a main body 152 shown in FIGS. 8 and 9, a pair of font and rear protrusions 153 and 154 shown in FIG. 8, a pair of stops 155 and 156 shown in FIG. 9 and an upper protrusion 157 shown in FIG. 9.

Each left and right end portion of the first driven shaft 121A and the second driven shaft 121B is rotatably inserted in to the main body 152 of each shaft bearing.

As shown in FIG. 8, the pair of the front protrusion 153 and the rear protrusion 154 are arranged in the front-rear direction. The front protrusion 153 protrudes to the front from a center of the main body 152 in the right-left direction and extends in the up-down direction. The rear protrusion 154 protrudes to the rear from the center of the main body 152 in the right-left direction and extends in the up-down direction.

As shown in FIG. 9, the pair of stops 155 and 156 are arranged in the right-left direction. The left-side stop 155 extends upward from the left end of the main body 152. A protrusion 158 protruding to the left is formed on a leading end of the left-side stop 155. The right-side stop 156 extends upward from the right end of the main body 152. A protrusion 159 protruding to the right is formed on a leading end of the right-side stop 156.

The upper protrusion 157 is disposed on the center of the main body 152 between the pair of the stops 155 and 156. The upper protrusion 157 protrudes upward from the main body 152.

As shown in FIGS. 8 and 9, four fitting portions 161A, 161B, 161C and 161D are formed on the first upper holding portion 81 of the second holder 62 with intervals therebetween in the right-left direction. The fitting portions 161A, 161B, 161C and 161D are depressed portions depressed upward from a bottom surface of the second holder 62.

As shown in FIG. 8, a front-left extending portion 162, a front-right extending portion 163, a rear-left extending portion 164 and a rear-right extending portion 165 are formed in the each fitting portion 161A, 161B, 161C and 161D. The front-left extending portion 162 and the front-right extending portion 163 protrude to the rear from a center of a front end of the fitting portion 161 in the right-left direction and extend in the up-down direction. Between the front-left extending portion 162 and the front-right extending portion 163, an interval larger than the width of the front protrusion 153 in the right-left direction is formed. The rear-left extending portion 164 and the rear-right extending portion 165 protrude to the front from a center of a rear end of the fitting portion 161 in the right-left direction and extend in the up-down direction. Between the rear-left extending portion 164 and the rear-right extending portion 165, an interval larger than the width of the rear protrusion 154 in the right-left direction is formed. Additionally, between the front-left extending portion 162 and the rear-left extending portion 164, and between the front-right extending portion 163 and the rear-right extending portion 165, intervals larger than the width of the main body 152 in the front-rear direction are formed, respectively.

The shaft bearings 151A, 151B, 151C and 151D are fitted, from below, to the fitting portions 161A, 161B, 161C and 161D, respectively. When the shaft bearings 151A, 151B, 151C and 151D are fitted to the fitting portions 161A, 161B, 161C and 161D, the main body 152 is located between the front-left extending portion 162 and the rear-left extending portion 164 and between the front-right extending portion 163 and the rear-right extending portion 165. The front protrusion 153 is located between the front-left extending portion 162 and the front-right extending portion 163. The rear protrusion 154 is located between the rear-left extending portion 164 and the rear-right extending portion 165. According to this configuration, movements of the shaft bearings 151A, 151B, 151C and 151D in the front-rear direction and the right-left direction can be suppressed. Additionally, as shown in FIG. 9, the protrusion 158 of the stop 155 and the protrusion 159 of the stop 156 are located above the peripheral edge of the fitting portion 161. Accordingly, the shaft bearings 151A, 151B, 151C and 151D are prevented from coming off the fitting portions 161A, 161B, 161C and 161D by the protrusions 158 and 159 in contact with the peripheral edge of the fitting portion 161 from above.

Figure 10:
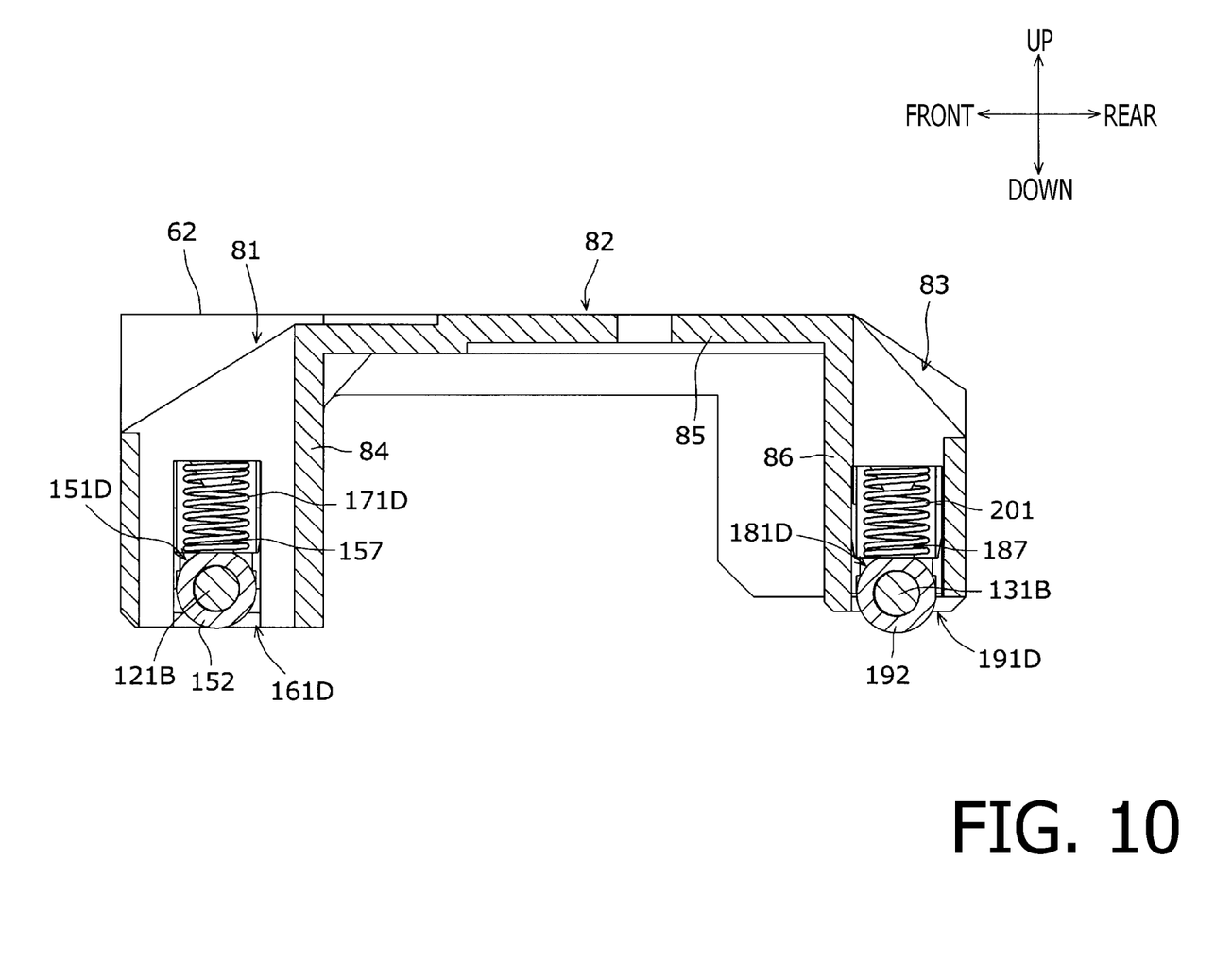
FIG. 10 is a cross-sectional side view of the first holder sectioned by a B-B line shown in FIG. 8.

As shown in FIGS. 9 and 10, press springs 171A, 171B, 171C and 171D are disposed between each shaft bearing 151A, 151B, 151C and 151D and the second holder 62. The press springs 171A, 171B, 171C and 171D have the same configuration as each other. The upper protrusion 157 of each shaft bearing 151A, 151B, 151C and 151D is inserted into the lower end of each press spring 171A, 171B, 171C and 171D. The press springs 171A, 171B, 171C and 171D respectively pressed the shaft bearings 151A, 151B, 151C and 151D downward.

According to this configuration, the right end portion of the first driven shaft 121A is urged downward, via the shaft bearing 151A, at a first urging position where the upper protrusion 157 of the shaft bearing 151A is located in the right-left direction. The left end portion of the first driven shaft 121A is urged downward, via the shaft bearing 151C, at a third urging position where the upper protrusion 157 of the shaft bearing 151C is located in the right-left direction. The right end portion of the second driven shaft 121B is urged downward, via the shaft bearing 151B, at a second urging position where the upper protrusion 157 of the shaft bearing 151B is located in the right-left direction. The left end portion of the second driven shaft 121B is urged downward, via the shaft bearing 151D, at a fourth urging position where the upper protrusion 157 of the shaft bearing 151D is located in the right-left direction.

As shown in FIGS. 6 and 9, a distance between the first urging position and the center of the first driven roller 97A, a distance between the second urging position and the center of the second driven roller 97B, a distance between the third urging position and the center of the third driven roller 97C and a distance between the fourth urging position and the center of the fourth driven roller 97D are the same distance D. According to this configuration, the third urging position is symmetrical to and the first urging position about a center of the first driven shaft 121A in the right-left direction. In addition, the fourth urging position is symmetrical to the second urging position about a center of the second driven shaft 121B in the right-left direction.

Additionally, since the press springs 171A, 171B, 171C and 171D have the same configuration as each other, the first urging position, the second urging position, the third urging position and the fourth urging position are pressed with the same force.

The driving shaft 101 is inserted into the first driving roller 96A, the second driving roller 96B, the third driving roller 96C and the fourth driving roller 96D so as to be a common rotation shat thereof.

<Discharge Roller Pairs>

As shown in FIG. 6, the four discharge driven rollers 99 are arranged on a same straight line with intervals therebetween in the right-left direction.

Hereinafter, in order to distinguish each discharge driven roller 99, a rightmost discharge driven roller 99 is referred to as "a first driven roller 99A," a third rightmost discharge driven roller 99 is referred to as "a second driven roller 99B," a discharge driven roller 99 between the first driven roller 99A and the second driven roller 99B is referred to as "a third driven roller 99C," and a leftmost discharge driven roller 99 is referred to as "a fourth driven roller 99D."

The first driven roller 99A, the second driven roller 99B, the third driven roller 99C and the fourth driven roller 99D have the same configuration as the first driven roller 97A, the second driven roller 97B, the third driven roller 97C and the fourth driven roller 97D of the conveyance roller pairs 91. In addition, the first driven roller 99A, the second driven roller 99B, the third driven roller 99C and the fourth driven roller 99D are located on the same position as the first driven roller 97A, the second driven roller 97B, the third driven roller 97C and the fourth driven roller 97D, respectively, in the right-left direction.

The driven shaft 131 includes a first driven shaft 131A and a second driven shaft 131B separated from each other. The first driven shaft 131A has the same configuration as the first driven shaft 121A of the conveyance roller pairs 91 and the first driven shaft 131A is located on the same position as the first driven shaft 121A in the right-left direction. In addition, the second driven shaft 131B has the same configuration as the second driven shaft 121B of the conveyance roller pairs 91 and the second driven shaft 131B is located on the same position as the second driven shaft 121B in the right-left direction.

As shown in FIGS. 6 and 8, a right end and a left end of the first driven shaft 131A are rotatably inserted into shaft bearings 181A and 181C, respectively. In addition, a right end and a left end of the second driven shaft 131B are rotatably inserted into shaft bearings 181B and 181D, respectively.

The shaft bearings 181A, 181B, 181C and 181D have the same configuration as the shaft bearings 151A, 151B, 151C and 151D, respectively. In addition, the shaft bearings 181A, 181B, 181C and 181D are respectively located on the same position as the shaft bearings 151A, 151B, 151C and 151D in the right-left direction.

As shown in FIG. 5, the four discharge driving rollers 98 are arranged on a same straight line with intervals therebetween in the right-left direction.

Hereinafter, in order to distinguish each discharge driving roller 98, a rightmost discharge driving roller 98 is referred to as "a first driving roller 98A," a third rightmost discharge driving roller 98 is referred to as "a second driving roller 98B," a discharge driving roller 98 between the first driving roller 98A and the second driving roller 98B is referred to as "a third driving roller 98C," and a leftmost discharge driving roller 98 is referred to as "a fourth driving roller 98D."

The first driving roller 98A, the second driving roller 98B, the third driving roller 98C and the fourth driving roller 98D have the same configuration as the first driving roller 96A, the second driving roller 96B, the third driving roller 96C and the fourth driving roller 96D of the conveyance roller pairs 91. Additionally, the first driving roller 98A, the second driving roller 98B, the third driving roller 98C and the fourth driving roller 98D are located on the same position as the first driving roller 96A, the second driving roller 96B, the third driving roller 96C and the fourth driving roller 96D, respectively, in the right-left direction.

The driving shaft 109 has the same configuration as the driving shaft 101 of the conveyance roller pair 91, and the driving shaft 109 is located on the same position as the driving shaft 101 in the right-left direction.

As described above, the user can recognize the reference position to place the sheet S in the width direction by providing the third wall 34.

In the embodiment, the separate first driven shaft 121A and the second driven shaft 121B are inserted into the first driven roller 97A and the second driven roller 97B, respectively. In addition, the first driven shaft 121A and the second driven shaft 121B are urged to the first driving roller 96A and the second driving roller 96B, respectively. According to this configuration, a difference of the nipping force applied to the sheet S by the first driven roller 97A and by the second driven roller 97B can be suppressed. As a result, difference of the conveyance force applied to the sheet S by the first driving roller 96A and the first driven roller 97A, and by the second driving roller 96B and the second driven roller 97B can be suppressed. Thus, skewing of the sheet S can be prevented.

In the conveyance roller pairs 91, a distance between the third wall 34 and the first driven roller 97A in the right-left direction is shorter than a distance between the first driven roller 97A and the second driven roller 97B in the right-left direction. Specifically, the distance between the left end of the first driven roller 97A and the third wall 34 is shorter than 51 mm. The distance between the right end of the second driven roller 97B and the third wall 34 is longer than 100 mm. The distance between the left end of the second driven roller 97B and the third wall 34 is shorter than 148 mm.

According to this configuration, a sheet S having a general size, such as the register receipt, the card sized sheet defined in International Standard ID-1, the post card sized sheet, the A5 sized sheet defined by JIS, the B5 sized sheet defined by JIS or the LTR sized sheet can be conveyed by the first driving roller 96A, the first driven roller 97A, the second driving roller 96B and the second driven roller 97B while both right and left ends of the sheet S do not contact with the circumferential surfaces of the first driving roller 96A, the first driven roller 97A, the second driving roller 96B and the second driven roller 97B. As a result, corner portions of the leading end of the sheet S can be prevented from being folded by the first driving roller 96A, the first driven roller 97A, the second driving roller 96B and the second driven roller 97B in contact with the ends of the sheet S.

In the conveyance roller pairs 91, the third driven roller 97C is located between the first driven roller 97A and the second driven roller 97B in the right-left direction. Additionally, the fourth driven roller 97D is located on the left side of the second driven roller 97B. The first driven shaft 121A is inserted into the first driven roller 97A and the third driven roller 97C. The second driven shaft 121B is inserted into the second driven roller 97B and the fourth driven roller 97D. Since two rollers (i.e., the first driven roller 97A and the third driven roller 97C) are supported by the first driven shaft 121A and the same number of rollers (i.e., the second driven roller 97B and the fourth driven roller 97D) are supported by the second driven shaft 121B, the nipping force applied to the sheet S by the first driven roller 97A and the third driven roller 97C and the nipping force applied to the sheet S by the second driven roller 97B and the fourth driven roller 97D can be equalized. As a result, a difference of the conveyance force applied to the sheet S by the first driving roller 96A and the first driven roller 97A and the third driving roller 96C and the third driven roller 97C, and by the second driving roller 96B and the second driven roller 97B and the fourth driving roller 96D and the fourth driven roller 97D can be suppressed. Thus, skewing of the sheet S can be prevented.

In the conveyance roller pairs 91, the first driven shaft 121A is shorter than the second driven shaft 121B. Therefore, a distance between the first driven roller 97A and the third driven roller 97C can be relatively shortened. Additionally, a distance between the second driven roller 97B and the fourth driven roller 97D can be relatively elongated. Thus, the first driven roller 97A, the second driven roller 97B, the third driven roller 97C and the fourth driven roller 97D can be arranged based on the size of the sheet S in the right-left direction so that the both right and left ends of the sheet S do not contact with the first driven roller 97A, the second driven roller 97B, the third driven roller 97C and the fourth driven roller 97D. As a result, the corner portions of the leading end of the sheet S can be prevented from being folded.

In the conveyance roller pairs 91, the right end portion of the first driven roller 121A is urged downward at the first urging position where the upper protrusion 157 of the shaft bearing 151A is located in the right-left direction. The left end portion of the first driven shaft 121A is urged downward at the third urging position where the upper protrusion 157 of the shaft bearing 151C is located in the right-left direction. The right end portion of the second driven shaft 121B is urged downward at the second urging position where the upper protrusion 157 of the shaft bearing 151B is located in the right-left direction. The left end portion of the second driven shaft 121B is urged downward at the fourth urging position where the upper protrusion 157 of the shaft bearing 151D is located in the right-left direction. In addition, the third urging position is symmetrical to the first urging position about the center of the first driven shaft 121A in the right-left direction. The fourth urging position is symmetrical to the second urging position about the center of the second driven shaft 121B in the right-left direction. According to this configuration, the first driven shaft 121A and the second driven shaft 121B can be urged evenly in the right-left direction.

The distance D between the first urging position and the center of the first driven roller 97A is the same as the distance D between the third urging position and the center of the third driven roller 97C. The distance D between the second urging position and the center of the second driven roller 97B is the same as the distance D between the fourth urging position and the center of the fourth driven roller 97D. Therefore the urging force on the first urging position and the urging force on the third urging position can be equally transmitted to the first driven roller 97A and the third driven roller 97C. Additionally, the urging force on the second urging position and the urging force on the fourth urging position can be equally transmitted to the second driven roller 97B and the fourth driven roller 97D. In this regard, the urging force at the first urging position, the second urging position, the third urging position and the fourth urging position are the same. According to this configuration, a difference of the nipping force applied to the sheet S by the first driven roller 97A, the second driven roller 97B, the third driven roller 97C and the fourth driven roller 97D can be suppressed. As a result, the various size of the sheet S can be conveyed in a favorable manner.

The conveyance roller pairs 91 include the driving shaft 101 inserted into the first driving roller 96A, the second driving roller 96B, the third driving roller 96C and the fourth driving roller 96D. According to this configuration, driving force can be transmitted to the first driving roller 96A, the second driving roller 96B, the third driving roller 96C and the fourth driving roller 96D in a single line.

Thus, the configuration of the image reading apparatus 1 can be simplified. As a result, a cost of the apparatus can be reduced.

The image reading apparatus includes the actuator 52 for detecting a presence of the sheet S. The actuator 52 is located between the first driven roller 97A and the third wall 34 in the right-left direction. In other words, the actuator 52 is located relatively near the third wall 34.

According to this configuration, the user can acknowledge that, in order to use the image reading apparatus 1, the sheet S is to be placed near the third wall 34 to contact the actuator 52.

The housing 2 of the image reading apparatus 1 supports the first reader unit 93 and the second reader unit 94. In addition, the inlet 41 extending in the right-left direction through which the sheet S is introduced is formed on the image reading apparatus 1. Further, the image reading apparatus 1 includes the second wall 33 to support the sheet S to be introduced through the inlet 41 on the front side of the inlet 41. The second wall 33 extends to the left to the left surface 11 of the housing 2.

Therefore, the third wall 34 is exposed on the left side thereof. Thus, the user can easily recognize that the third wall 34 is a reference position to place the sheet S in the right-left direction.

The discharge roller pairs 95 have the same effects as the conveyance roller pairs 91.

Modification Examples

Only an exemplary embodiment of the disclosure and a few examples of their versatility are shown and described in the disclosure. It is to be understood that the disclosure is capable of use in various other combinations and environments and is capable of changes or modifications within the scope of the inventive concept as expressed herein.

For example, while the conveyance roller pairs 91 includes four conveyance driven rollers 97 in the embodiment, the conveyance roller pairs 91 may include six or more conveyance driven rollers 97. In this case, the driven shaft 121 may be separated into two or more driven shafts, and the same number of the conveyance driven rollers 97 may be inserted into each driven shaft. Additionally, it is favorable that both ends of the each driven shaft are urged against the conveyance driving roller 96. The conveyance roller pairs 91 may include two conveyance driven rollers 97, and the separated driven shafts may be inserted into each one of two conveyance driven rollers 97. The same modifications may be applied to the discharge roller pair. In addition, the components of the image reading apparatus may be arranged such that the right-left direction is reversed. For example, although the third wall 34 is disposed on the right side of the image reading apparatus 1 and the left side thereof is exposed in the above embodiment, the third wall 34 may be disposed on the left side of the image reading apparatus 1 and the right side thereof may be exposed. In this case, the arrangement of the other components (i.e., sensor 51, the conveyance roller pairs 91, the discharge roller pairs 95, and etc.) is reversed in the right-left direction.

What is claimed is:

1. An image reading apparatus comprising:
a wall disposed on a first side of the image reading apparatus in a width direction, the wall extending in a direction orthogonal to the width direction, the width direction being orthogonal to a conveyance direction of a sheet on which an image to be read by the image reading apparatus is formed;
a first driven roller disposed on a second side of the image reading apparatus in the width direction relative to the wall, the second side being opposite to the first side;
a first driving roller opposed to the first driven roller;
a first driven shaft inserted into the first driven roller and urged against the first driving roller;
a second driven roller disposed on the second side relative to the first driven roller;
a second driving roller opposed to the second driven roller;
a second driven shaft inserted into the second driven roller and urged against the second driving roller;
a third driven roller disposed between the first driven roller and the second driven roller in the width direction;
a third driving roller opposed to the third driven roller;
a fourth driven roller disposed on the second side relative to the second driven roller;
a fourth driving roller opposed to the fourth driven roller; and
a reader unit configured to read the image on the sheet,
wherein the first driven shaft is inserted into the first driven roller and the third driven roller,
wherein the second driven shaft is inserted into the second driven roller and the fourth driven roller, and
wherein the first driven shaft is shorter than the second driven shaft.

2. The image reading apparatus according to claim 1, wherein a distance between the wall and the first driven roller in the width direction is shorter than a distance between the first driven roller and the second driven roller.

3. The image reading apparatus according to claim 1, wherein,
the first driven shaft is urged at a first urging position on the first side relative to the first driven roller and a third urging position on the second side relative to the third driven roller,
the second driven shaft is urged at a second urging position on the first side relative to the second driven roller and a fourth urging position on the second side relative to the fourth driven roller,
a distance between a center of the first driven shaft and the first urging position is the same as a distance between the center of the first driven shaft and the third urging position, and
a distance between a center of the second driven shaft and the second urging position is the same as a distance between the center of the second driven shaft and the fourth urging position.

4. The image reading apparatus according to claim 3, wherein,
a distance between the first urging position and the first driven roller is the same as a distance between the third urging position and the third driven roller, and
a distance between the second urging position and the second driven roller is the same as a distance between the fourth urging position and the fourth driven roller.

5. The image reading apparatus according to claim 3, wherein magnitude of urging force at the first urging position, the second urging position, the third urging position and the fourth urging position are the same.

6. The image reading apparatus according to claim 1, further comprising a driving shaft inserted into the first driving roller, the second driving roller, the third driving roller and the fourth driving roller.

7. The image reading apparatus according to claim 1, further comprising:
conveyance roller pairs disposed on an upstream side of the reader unit in the conveyance direction; and
discharge roller pairs disposed on a downstream side of the reader unit in the conveyance direction,
wherein the conveyance roller pairs and the discharge roller pairs include the first driving roller, the first driven roller, the first driven shaft, the second driving roller, the second driven roller and the second driven shaft, respectively.

8. The image reading apparatus according to claim 1, further comprising a detection unit configured to detect a presence of the sheet,
wherein the detection unit is disposed between the first driven roller and the wall in the width direction.

9. The image reading apparatus according to claim 1, further comprising:
a housing configured to accommodate the reader unit; and
a frame comprising the wall and a second wall, the second wall extending from the wall to a side surface of the housing on a second side end of the image reading apparatus in the width direction,
wherein the wall and the second wall form an inlet extending in the width direction and extending between an interior of the housing and an exterior of the housing.

10. A conveyance apparatus comprising:
a wall disposed on a first side of the conveyance apparatus in a width direction, the wall extending in a direction orthogonal to the width direction, the width direction being orthogonal to a conveyance direction of a sheet to be conveyed;
a first driven roller disposed on a second side of the conveyance apparatus in the width direction relative to the wall, the second side being opposite to the first side;
a first driving roller opposed to the first driven roller;
a first driven shaft inserted into the first driven roller and urged against the first driving roller;
a second driven roller disposed on the second side relative to the first driven roller;
a second driving roller opposed to the second driven roller;
a second driven shaft inserted into the second driven roller and urged against the second driving roller;
a third driven roller disposed between the first driven roller and the second driven roller in the width direction;
a third driving roller opposed to the third driven roller;

a fourth driven roller disposed on the second side relative to the second driven roller; and
a fourth driving roller opposed to the fourth driven roller,
wherein the first driven shaft is inserted into the first driven roller and the third driven roller,
wherein the second driven shaft is inserted into the second driven roller and the fourth driven roller, and
wherein the first driven shaft is shorter than the second driven shaft.

11. The conveyance apparatus according to claim 10, wherein a distance between the wall and the first driven roller in the width direction is shorter than a distance between the first driven roller and the second driven roller.

12. The conveyance apparatus according to claim 10, wherein,
the first driven shaft is urged at a first urging position on the first side relative to the first driven roller and a third urging position on the second side relative to the third driven roller,
the second driven shaft is urged at a second urging position on the first side relative to the second driven roller and a fourth urging position on the second side relative to the fourth driven roller,
a distance between a center of the first driven shaft and the first urging position is the same as a distance between the center of the first driven shaft and the third urging position, and
a distance between a center of the second driven shaft and the second urging position is the same as a distance between the center of the second driven shaft and the fourth urging position.

13. The conveyance apparatus according to claim 12, wherein,
a distance between the first urging position and the first driven roller is the same as a distance between the third urging position and the third driven roller, and
a distance between the second urging position and the second driven roller is the same as a distance between the fourth urging position and the fourth driven roller.

14. The conveyance apparatus according to claim 12, wherein magnitude of urging force at the first urging position, the second urging position, the third urging position and the fourth urging position are the same.

15. The conveyance apparatus according to claim 10, further comprising a driving shaft inserted into the first driving roller, the second driving roller, the third driving roller and the fourth driving roller.

16. The conveyance apparatus according to claim 10, further comprising:
a reader unit configured to read an image on the sheet;
conveyance roller pairs disposed on an upstream side of the reader unit in the conveyance direction; and
discharge roller pairs disposed on a downstream side of the reader unit in the conveyance direction,
wherein the conveyance roller pairs and the discharge roller pairs include the first driving roller, the first driven roller, the first driven shaft, the second driving roller, the second driven roller and the second driven shaft, respectively.

17. The conveyance apparatus according to claim 10, further comprising a detection unit configured to detect a presence of the sheet,
wherein the detection unit is disposed between the first driven roller and the wall in the width direction.

18. The conveyance apparatus according to claim 10, further comprising:
a reader unit configured to read an image on the sheet;
a housing configured to accommodate the reader unit; and
a frame comprising the wall and a second wall, the second wall extending from the wall to a side surface of the housing on a second side end of the conveyance apparatus in the width direction,
wherein the wall and the second wall form an inlet extending in the width direction and extending between an interior of the housing and an exterior of the housing.

19. An image reading apparatus comprising:
a wall disposed on a first side of the image reading apparatus in a width direction, the wall extending in a direction orthogonal to the width direction, the width direction being orthogonal to a conveyance direction of a sheet on which an image to be read by the image reading apparatus is formed;
a first driven roller disposed on a second side of the image reading apparatus in the width direction relative to the wall, the second side being opposite to the first side;
a first driving roller opposed to the first driven roller;
a first driven shaft inserted into the first driven roller and urged against the first driving roller;
a second driven roller disposed on the second side relative to the first driven roller;
a second driving roller opposed to the second driven roller;
a second driven shaft inserted into the second driven roller and urged against the second driving roller;
a reader unit configured to read the image on the sheet; and
a detection unit configured to detect a presence of the sheet,
wherein the detection unit is disposed between the first driven roller and the wall in the width direction.

20. The image reading apparatus according to claim 19, wherein a distance between the wall and the first driven roller in the width direction is shorter than a distance between the first driven roller and the second driven roller.

21. The image reading apparatus according to claim 19, further comprising:
conveyance roller pairs disposed on an upstream side of the reader unit in the conveyance direction; and
discharge roller pairs disposed on a downstream side of the reader unit in the conveyance direction,
wherein the conveyance roller pairs and the discharge roller pairs include the first driving roller, the first driven roller, the first driven shaft, the second driving roller, the second driven roller and the second driven shaft, respectively.

22. The image reading apparatus according to claim 19, further comprising:
a housing configured to accommodate the reader unit; and
a frame comprising the wall and a second wall, the second wall extending from the wall to a side surface of the housing on a second side end of the image reading apparatus in the width direction,
wherein the wall and the second wall form an inlet extending in the width direction and extending between an interior of the housing and an exterior of the housing.

* * * * *